Jan. 22, 1963     D. D. PEEBLES ETAL     3,074,797
MILK TREATMENT PROCESS
Filed July 27, 1959
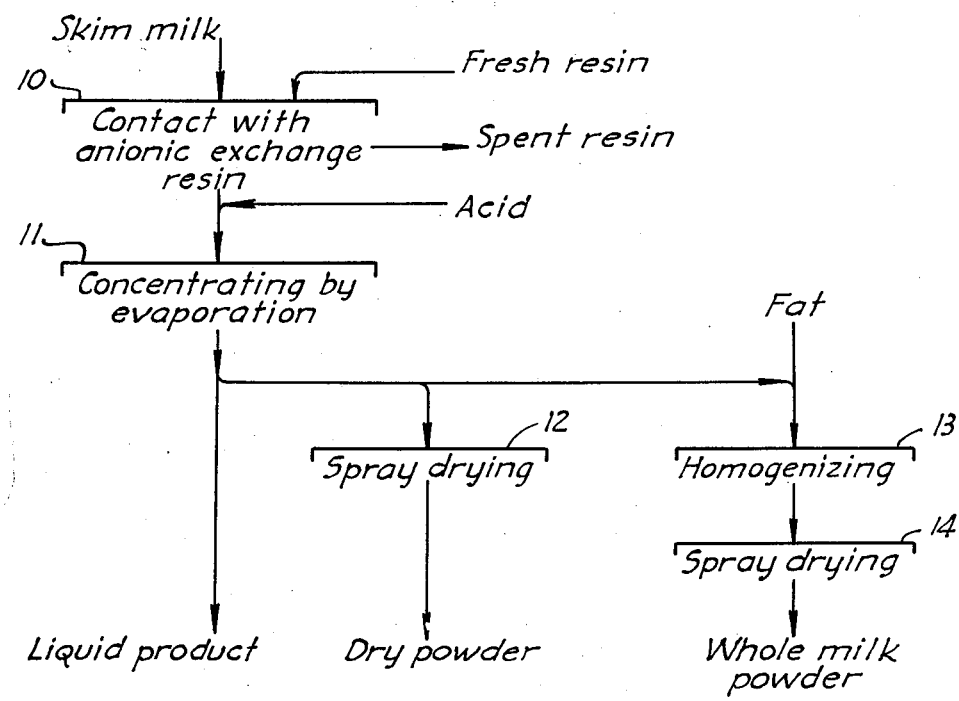
INVENTORS
David D. Peebles
Paul D. Clary, Jr.
Clayton A. Kempf
BY
ATTORNEYS

United States Patent Office 3,074,797
Patented Jan. 22, 1963

3,074,797
MILK TREATMENT PROCESS
David D. Peebles, Davis, Paul D. Clary, Jr., Petaluma, and Clayton A. Kempf, Berkeley, Calif., assignors to Foremost Dairies, Inc., San Francisco, Calif., a corporation of New York
Filed July 27, 1959, Ser. No. 829,730
4 Claims. (Cl. 99—60)

This invention relates generally to the processing of milk and milk-containing products, to improve their ability to keep without staling.

It is well-known in the dairy industry that many milk and milk-containing products are subject to serious deterioration during storage. Aside from such obvious changes as may result from fermentation, rancidity or the like, more subtle changes tend to occur during storage which the industry refers to as staling. Staling may be defined as the development of an off or undesirable flavor, together with a loss of such flavor characteristics as are normally associated with the fresh product. Unless staling has proceeded to the point of definite spoilage, there is no marked change in the basic makeup of the product. A typical example of a milk product subject to staling is dry nonfat milk solids, commonly known as dry skim milk powder. When first produced, as by pasteurization, concentration by vacuum evaporation and spray drying, it has the natural flavor of fresh milk. However, when stored, changes take place whereby there is a gradual loss of the natural flavor, together with the development of undesirable stale flavor constituents which may be described by observers as development of "feed" (i.e. straw), oxidized (not to be confused with fat rancidity), soapy or cardboard flavors. Although the primary constituents of the milk (i.e. lactose and milk proteins) remain essentially unchanged, the marketability and practical value of the powder is seriously impaired, due to the fact that the stale flavor is carried into any product or mixture into which the product is introduced. Development of a detectable off odor is generally associated with staling, and in the more extreme cases, there may be a development of off color to the extent of producing what is known as "browning."

Various efforts have been made to prevent or minimize staling. The use of sealed containers is helpful in that exclusion of air may extend the time period before serious staling, aside from protecting a sterile product against spoilage. However, a powdered material like skim milk powder will continue to stale in a nonoxidizing atmosphere, and therefore the use of sealed containers is not a satisfactory solution. Also in many instances the expense involved makes the use of sealed containers prohibitive. Introduction of antioxidants or other preservatives may protect any fat content against oxidized flavor, but has little if any effect on staling. Special shock heating has been helpful in the development of natural anti-oxidants, but again has not been a solution of the basic staling problem.

In general it is an object of the present invention to provide a process capable of greatly improving the ability of a milk or milk-containing product to keep without staling.

A further object of the invention is to provide a process of the above character which can be applied with a minimum amount of equipment, and without seriously increasing overall processing costs.

Another object of the invention is to provide a process of the above character which does not affect the basic makeup of the milk, and does not require the introduction of an antioxidant or other preservative.

Another object of the invention is to provide novel milk products resulting from our process.

Additional objects of the invention will appear from the following description in which the preferred embodiment has been set forth in detail in conjunction with the accompanying drawing.

The present invention is predicated upon our discovery that if small amounts of certain constituents are removed from fresh milk, without altering its basic makeup, the product can be greatly improved with respect to its ability to withstand staling, with retention of the desired natural flavor. We have found that such constituents are effectively removed by contact with a milk with a suitable anionic exchange resin, which serves to remove such acidic ions as chloride and phosphates, and presumably other constituents, without altering the essential makeup of milk, and without any deterioration of the desired flavor. We are unable to give a precise technical explanation of the invention. However, according to our observations and information, such substances as amino acids, urea, guanidine, uric acid, and certain vitamins, as well as peptides, proteoses and peptones, may play a part in the results obtained.

The invention can be carried out by flowing fresh milk, with or without preliminary processing such as pasteurizing or concentration, through a column of an anion exchange resin charged with hydroxyl ions. When operating in accordance with the batch method, the pH of the milk leaving the column may vary somewhat between the beginning and end of the run. With continuous column techniques the pH of the milk can be maintained substantially constant. For example with fresh skim milk having a pH of about 6.8, during batch treatment the pH may vary from about 9.5 at the beginning of the run, to about 7.0 at the end of the run, giving an average pH for the treated batch of 8.4–8.5. With continuous techniques, where fresh resin is continuously supplied and spent resin continuously removed from the process, the pH of the treated milk can be maintained at a desired value of say 8.4–8.5. Of the acidic inorganic ions removed by the resin, the major constituents are chloride, phosphate and citrate ions, which are present in salts of such elements as sodium, calcium, magnesium and potassium. In practice one can obtain a fair quantitative check of the extent to which acidic ions are removed, by noting the change in pH, or by an analysis of the amount of chlorides present. For example when the amount of chlorides present in fresh skim milk has been reduced by about 50%, the pH value is increased from an initial 6.8 to about 8.4–8.5.

At the pH level of 8.4–8.5 some cations, particularly calcium appear to precipitate as calcium salts of phosphates, citrates and the like, and these are removed.

Spent resin can be regenerated for reuse in the process. Care must be taken to regenerate in such a manner as to avoid inadvertent introduction of components from the resin into the milk. In practice it has been satisfactory to regenerate by contact with an acid like hydrochloric, followed by contact with a caustic solution (e.g. NaOH) and washing thoroughly with fresh water.

Following treatment of the milk by contact with onionic exchange resin, it may if desired be adjusted to or toward neutrality. Care must be taken to avoid introduction of such components as may detrimentally affect the flavor. Good results can be obtained by introducing measured amount of acids such as citric or hydrochloric. The composition of the milk can be restored to normal by adding chloride citrate and phosphate salts (e.g. sodium chloride, sodium citrate, and calcium phosphate) corresponding to the amounts of such salts removed by the resin.

Since acidic ions can be added back to the treated milk, without affecting its ability to withstand staling, it is evident that small amounts of certain components are removed by the anonic exchange resin, some of which are difficult or impossible to detect by ordinary methods of analysis, and which when absent make possible a milk having the desired characteristics. Also it is possible that certain complex compounds of the milk are altered or stabilized in such a manner as to prevent staling.

The treated milk may be used and stored in liquid form, or reduced to a dry powder as by spray drying. Before drying, other materials can be added to produce a variety of modified products. For example various amounts of butterfat can be intermixed with the treated liquid milk, and the mixture homogenized and spray dried. In this way products can be made to contain various amounts of fat, ranging from whole milk to cream. Also various flavoring materials can be added, such as sweetening, chocolate, coffee and the like.

The spray dried material can be of the conventional finely divided type, or it may be of the instant type which is granular and capable of being quickly dispersed in water by simple stirring. Such instant milk products, and processes for their manufacture, are well known in the industry.

The process as described above has been outlined in the flow sheet. Skim milk is shown being supplied to the step 10, where it is contacted with an anionic exchange resin. Measured amounts of an acid are supplied to the treated milk to readjust the pH, after which the milk is subjected to concentration by evaporation to step 11. As indicated a portion of the resulting concentrate can be diverted from the process as a liquid product, while another portion may be supplied to the spray drying operation 12 to produce a dry powder. Another portion is shown being intermixed with measured amounts of fat, after which the mixture is subjected to homogenizing at 13, and spray drying at 14, to produce a fat-containing dry powder product, such as whole milk powder.

Examples of our invention are as follows:

*Example 1*

500 gallons of fresh skim milk at pH 6.8 was subjected to conventional pasteurization, after which it was pumped through a vertical column of an anionic exchange resin charged with hydroxyl ions using a column about 20 feet high, and containing about 40 cubic feet of the resin. The particular resin used was IR-45, made by an established manufacturer. At the beginning of the run the milk leaving the column was at pH of about 9.0, and at the end of the run the pH was about 8.0. This gave an average pH for the batch of treated milk of 8.5. The treated milk was concentrated by vacuum evaporation to 33% solids, after which it was supplied to a conventional spray-drying equipment, and reduced to the form of a finely divided powder. The dry powder product was of excellent quality and flavor. Quantities of this powder product were subjected to artificial aging together with a control sample of spray dried milk powder made from the same liquid milk, but without treatment by contact with the resin. Artificial aging involved holding the samples at a temperature of 100° F., exposed to atmospheric oxygen. At the end of 30 days, the control sample exhibited staling to a noticeable degree, whereas no changes could be detected in the samples processed in accordance with the present invention. At the end of 45 days the staling of the control sample had progressed to a noticeable extent, but again no evidence of staling could be found in the specially processed samples. After an additional six months storage the specially processed sample was still useable from the standpoint of flavor and was remarkably free from any change in color. The control sample had deteriorated long before this time to the point that it could only be used for animal feed. It suffered changes both in flavor and in color that were very extensive.

It will be evident from the foregoing that our invention has wide application to the manufacture of a variety of dairy products, or various food products containing milk solids. As previously explained various flavoring materials can be introduced into the liquid, to produce so-called flavored dairy products. Also either the treated liquid or a dry powder made in accordance with the present process, can be introduced into other products and mixes. Thus ice cream mixes that are better able to withstand staling, can be made by employing a dry skim milk made in accordance with the present process and intermixing the same with the other dry solids. Also if desired some of the ingredients of the ice cream mix can be introduced into the liquid milk immediately prior to spray drying. While some ingredients may be added to the milk prior to contact with the ion exchange resin, it generally is desirable to avoid the presence of such added ingredients as may cause undesired accumulations upon the resin granules. In this connection it is desirable to avoid the presence of fats, which have the effect of accumulating upon the surfaces of the resin granules and decreasing its effectiveness.

When applied to certain products, such as edible whey, there is a noticeable betterment in flavor, in addition to an improvement in the ability of the whey to keep without staling, thus permitting use of such treated whey in many applications (e.g. beverages, etc.) where ordinary edible whey would be objectionable. While the protein content of whey is relatively low compared to skim milk, it does contain complex nitrogen compounds, and also peptide nitrogen compounds, both of which types of compounds may contribute to staling.

We claim:

1. In a process for the treatment of milk to improve its ability to keep without staling, essentially the step of subjecting the milk to deanionizing treatment by contacting the milk with an anionic exchange resin charged with hydroxyl ions, said treatment serving to remove small amounts of certain constituents present, without effecting any substantial change in the makeup of the milk, and without reducing the pH value of the effluent material resulting from said treatment below about 7.0 during said treatment, the material resulting from said treatment having the desired improved ability to keep without staling.

2. In a process for the treatment of milk, subjecting the milk to deanionizing treatment by contacting the milk with an anionic exchange resin charged with hydroxyl ions to effect removal of acidic ions with a shift in the pH of the milk to about 8.4 to 8.5 without affecting a substantial change in the make-up of the milk and without reducing the pH value of the effluent material resulting from said treatment below about 7.0 during such treatment, said deanionized milk having improved ability to keep without staling.

3. A process as in claim 2 in which chloride, citrate and phosphate salts are added to the milk after such contact.

4. In a process for the treatment of liquid milk comprising essentially, the steps of contacting the liquid milk with an anionic exchange resin charged with hydroxyl ions whereby the pH of the milk is shifted to an average value of the order of from 8.4 to 8.5, and not less than pH 7.0 during such treatment and then converting the liquid material as so deanionized to a dry powder, the dry powder having improved ability to keep without staling.

References Cited in the file of this patent

UNITED STATES PATENTS

| 2,307,234 | Otting et al. | Jan. 5, 1943 |
| 2,503,866 | Chrysler et al. | Apr. 11, 1950 |
| 2,708,632 | Stimpson | May 17, 1955 |
| 2,708,633 | Stimpson et al. | May 17, 1955 |
| 2,860,057 | Wilcox | Nov. 11, 1958 |
| 2,879,166 | Wilcox | Mar. 24, 1959 |
| 2,903,358 | Block et al. | Sept. 8, 1959 |

FOREIGN PATENTS

| 742,647 | Great Britain | Dec. 30, 1955 |